(12) United States Patent
Singh et al.

(10) Patent No.: US 7,738,915 B2
(45) Date of Patent: Jun. 15, 2010

(54) SYSTEM AND METHOD FOR PRIVATE WIRELESS NETWORKS

(75) Inventors: Lakhbir Singh, Fairfax, VA (US); Justin David Wolf, Centreville, VA (US)

(73) Assignee: Nextel Communications Inc., Reston, VA (US)

( * ) Notice: Subject to any disclaimer, the term of this patent is extended or adjusted under 35 U.S.C. 154(b) by 1306 days.

(21) Appl. No.: 11/192,128

(22) Filed: Jul. 29, 2005

(65) Prior Publication Data

US 2006/0160565 A1 Jul. 20, 2006

Related U.S. Application Data

(60) Provisional application No. 60/643,588, filed on Jan. 14, 2005.

(51) Int. Cl.
| | |
|---|---|
| H04M 1/00 | (2006.01) |
| H04W 4/00 | (2009.01) |
| H04B 7/00 | (2006.01) |
| H04L 12/66 | (2006.01) |
| H04L 12/28 | (2006.01) |
| H04L 12/56 | (2006.01) |

(52) U.S. Cl. ............. 455/554.1; 455/432.1; 455/519; 455/552.1; 370/328; 370/352; 370/401

(58) Field of Classification Search .......... 455/12.1, 455/90.2, 418, 427, 428, 430, 517, 518, 519, 455/520, 521, 527, 554.1, 426.1, 456.3, 458, 455/552.1, 432.1, 432.2, 432.3, 433, 439, 455/553.1, 554.2, 555, 561; 370/260, 278, 370/296, 310, 328, 338, 341, 347, 349, 351, 370/352, 355, 356, 385, 395.5, 401, 466
See application file for complete search history.

(56) References Cited

U.S. PATENT DOCUMENTS

| | | | |
|---|---|---|---|
| 6,081,716 A | 6/2000 | Lu | |
| 6,272,334 B1 * | 8/2001 | Rao | ............. 455/418 |
| 6,285,879 B1 * | 9/2001 | Lechner et al. | ........... 455/432.3 |
| 6,411,825 B1 * | 6/2002 | Csapo et al. | ............... 455/561 |
| 6,640,108 B2 | 10/2003 | Lu et al. | |
| 6,658,259 B2 | 12/2003 | McIntosh | |
| 6,662,010 B1 * | 12/2003 | Tseitlin et al. | ........... 455/426.1 |
| 2001/0046214 A1 * | 11/2001 | Kang | .............. 370/328 |
| 2002/0001302 A1 * | 1/2002 | Pickett | ............. 370/352 |
| 2002/0037735 A1 * | 3/2002 | Maggenti et al. | ............ 455/517 |
| 2005/0101339 A1 * | 5/2005 | Bishop et al. | ............... 455/521 |
| 2005/0122923 A1 * | 6/2005 | Jang et al. | ............... 370/310 |
| 2005/0192034 A1 * | 9/2005 | Munje | ............. 455/458 |
| 2005/0239485 A1 * | 10/2005 | Kundu et al. | ............... 455/519 |

* cited by examiner

Primary Examiner—Nay A Maung
Assistant Examiner—Paul P Tran

(57) ABSTRACT

A method and system for private wireless network communications is provided. A private wireless network controller is coupled to a Private Branch Exchange (PBX), a private base transceiver station, and a Public Switched Telephone Network (PSTN). The private base transceiver station is coupled to a wireless macro network. The private wireless network controller and private base transceiver station allow connection of interconnect and dispatch wireless calls, which originate on the private wireless network, to other mobile stations on the private wireless network, to terminals connected to the PBX, to mobile stations on wireless macro networks, and to terminals coupled to the PSTN.

14 Claims, 8 Drawing Sheets

SYSTEM AND METHOD FOR PRIVATE WIRELESS NETWORKS

This application claims priority under 35 U.S.C. §119 to U.S. Provisional Application No. 60/643,588, filed Jan. 14, 2005, the entire disclosure of which is herein expressly incorporated by reference.

BACKGROUND OF THE INVENTION

Companies and other organizations rely upon mobile stations for their employees to remain accessible regardless of their location. A mobile station can be any type of wireless communication device including wireless telephones, wireless Personal Digital Assistants (PDA), wireless pagers, or any device which performs one or more of these functions. This accessibility applies to both travel away from the company's office and the ability to communicate within the office. While in the office employees may use a mobile station to receive telephone calls or electronic mail when they are not near their desktop telephone or computer.

Increased usage of wireless communications by companies has resulted in increasing bills for such wireless communications. To reduce costs for wireless communications which originate or terminate within a company's premises, some companies have installed private wireless networks to avoid paying wireless carriers for airtime for such communications. These private wireless networks typically are independent of wireless service providers' macro networks, expensive to implement, and do not provide a number of features which would be desired by businesses.

Some private wireless networks operate using communication protocols which are not typically employed by major wireless carriers on their macro networks. For example, some companies have attempted to implement private wireless networks which operate using Voice over wireless Internet Protocol (IP). While one advantage of using wireless protocols which are not compatible with protocols used by major wireless carriers is that the company does not have to be concerned with receiving charges for airtime usage on wireless macro networks, the use of incompatible protocols reduces the flexibility provided to the business. Specifically, if an employee is authorized to communicate within both a private wireless network and wireless macro network, the employee would be required to have two different mobile stations, each with a different telephone number. This is particularly inconvenient as such an arrangement requires the employee to carry two mobile stations while within the company's premises so that calls to either telephone number can be received. Additionally, this may result in the employee having two separate voicemail systems, one for each wireless network. Moreover, if an employee initiates a telephone call within the private wireless network and travels to an area outside of the private wireless network, the employee's telephone call will be dropped because the mobile station does not use the same protocols as wireless macro networks.

Accordingly, there is a need for a system and method of providing wireless communications over both publicly-accessible and private wireless networks.

SUMMARY OF THE INVENTION

A private wireless network includes a private wireless network controller and a private base transceiver station for supporting interconnect and dispatch wireless communications. The private wireless network controller and the private base transceiver station can route communications between the private wireless network, a private wired network such as a Private Branch Exchange (PBX) network, a wireless macro network, and a Public Switched Telephone Network (PSTN).

DETAILED DESCRIPTION OF THE PREFERRED EMBODIMENTS

Figure 1:
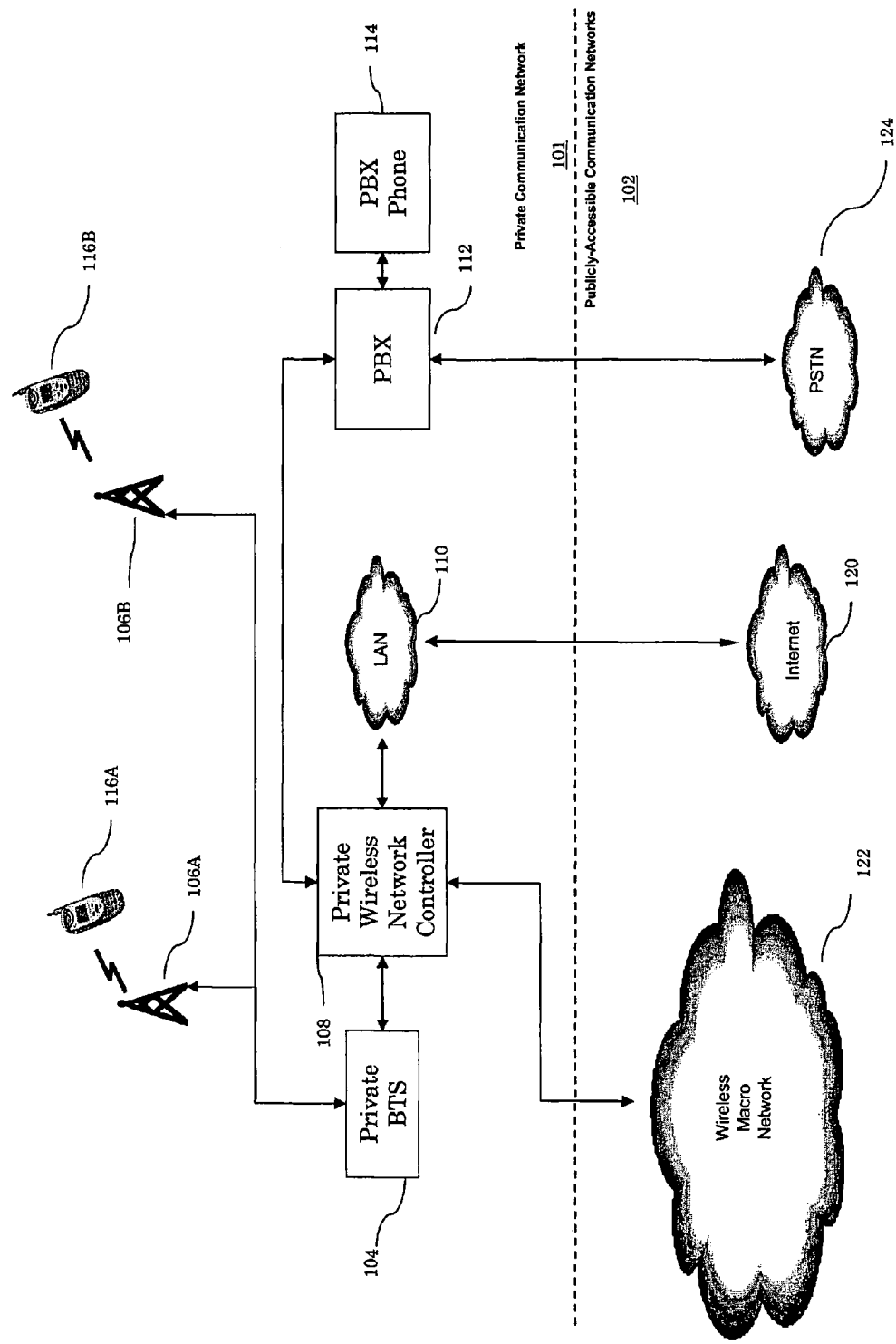
FIG. 1 illustrates a block diagram of an exemplary communication system.

FIG. 1 illustrates an exemplary communication system which allows a subscriber of a private wireless network to communicate over either the private wireless network or a wireless macro network. The system illustrated in FIG. 1 is divided into a private communication network 101 and publicly-accessible communication networks 102. The private communication network can cover one or more buildings (such as a "campus" of a building for a company), a single floor, or a portion of a floor occupied by a company. The private communications network 101 includes a private wireless network including a private base transceiver station (BTS) 104, antennas 106A and 106B and private wireless network controller 108. The private communications network 101 also includes a Local Area Network (LAN) 110, a Private Branch eXchange (PBX) 112, one or more PBX phones 114, and one or more wireless phones 116A and 116B. The publicly-accessible communication networks 102 include the Internet 120, a wireless macro network 122 and a Public Switched Telephone Network (PSTN) 124.

The private wireless network controller 108 provides wireless communications for mobile stations 116A and 116B in conjunction with private BTS 104 and antennas 106A and 106B. Mobile stations 116A and 116B can include circuitry and/or software for operating according to a protocol compatible with a wireless macro network (e.g., digital advanced mobile telephone service (D-AMPS), time division multiple access (TDMA), code division multiple access (CDMA), integrated enhanced dispatch network (iDEN), global system for mobile communication (GSM), or the like), a protocol compatible only with the private wireless network (e.g., using WiFi and voice over wireless IP, or the like), or a combination of wireless macro network and private wireless network protocols (with the mobile station selecting which protocol to use for communicating). Mobile station 116A can communicate with destinations which are part of the private communication network's telephone system, such as PBX phone 114, using private wireless network controller's connection to PBX 112. Moreover, private wireless network controller 108 can provide wireless communications between mobile stations 116A and 116B. Using the private wireless network controller 108, the mobile stations 116A and 116B can also communicate over the Internet 120 (via LAN 110), the wireless macro network 122 (via private BTS 104) or the PSTN 124 (via PBX 112).

Although FIG. 1 illustrates the private wireless network controller coupled to a single wireless macro network 122, the private wireless network controller 108 can be coupled to more than one wireless macro network. This connection may involve a separate private wireless network controller for each wireless macro network. Moreover, communications can occur with subscribers located in other wireless macro networks which do not have an interface with the private wireless network controller 108 by routing the communications over the PSTN 124.

The private wireless network controller 108 can provide mobile stations operating on the private wireless network with the same functionality and restrictions typically associated with PBX networks. For example, the private wireless network controller 108 can provide mobile stations operating on the private wireless network with abbreviated number dialing (such as four digit dialing), toll restrictions, billing code entry and the like.

Figure 2:
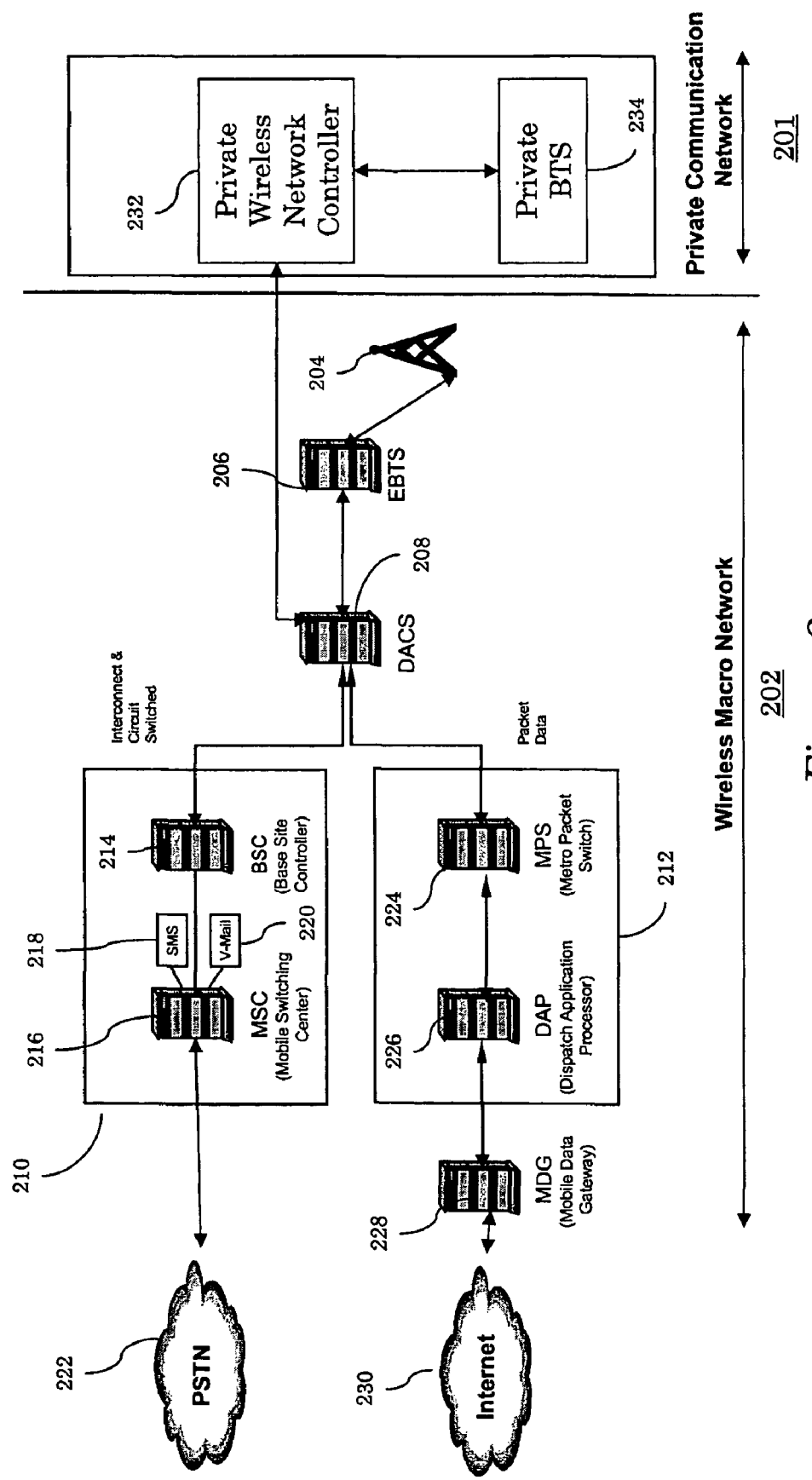
FIG. 2 illustrates a block diagram of exemplary publicly-accessible and private wireless networks.

FIG. 2 illustrates a block diagram of an exemplary communication system which allows mobile stations in a private wireless network to initiate and receive interconnect and dispatch communications with communications devices outside of the private wireless network. FIG. 2 includes a private communication network 201 and wireless macro network 202. For purposes of explanation, and not limitation, the illustrated wireless macro network is based upon an iDEN communications system such as that owned and operated by Nextel Communications, Inc. of Reston, Va. However, the wireless macro network 202 can be any type of wireless communication system such as one that operates in accordance with TDMA, CDMA, GSM, D-AMPS, or any other wireless communication protocol. The wireless macro network 202 includes at least one wireless antenna 204, an enhanced BTS (EBTS) 206, a Digital Access Cross-connect Switch (DACS) 208, an interconnect and circuit-switched processing portion 210, and a packet data processing portion 212. If the wireless macro network is not an iDEN network, then the private wireless network controller will be coupled to the Base Site Controller (BSC) 214.

The antenna 204 and EBTS 206 transmit and receive wireless communications with mobile stations (not shown) within the wireless macro network 202. The EBTS 206 provides communications which are received over antenna 204 to DACS 208. Depending upon the type of communications, DACS 208 routes the communications to either the interconnect and circuit-switched processing portion 210 or the packet data processing portion 212. Interconnect communication is what is conventionally considered "cellular communications" and are handled in a conventional manner by interconnect and circuit-switched processing portion 210. Specifically, interconnect and circuit-switched processing portion 210 includes a BSC 214 and a Mobile Switching Center (MSC) 216. MSC 216 can have a connection to a Short Message Service (SMS) processor 218 and a voicemail processor 220. MSC 216 transmits and receives communications between the wireless macro network 202 and the PSTN 222.

Packet Data Processing Portion 212 includes a Metro Packet Switch (MPS) 224 and a Dispatch Application Processor (DAP) 226. The Packet Data Processing Portion 212 is coupled to the Internet 230 via Mobile Data Gateway (MDG) 228. The packet data processing portion 212 processes both computer-type packet data and dispatch call data. A dispatch call is commonly known as a walkie-talkie or push-to-talk (PTT) type of call such as Nextel's service identified by the trade name Direct Connect.

Dispatch calls are routed based upon a Universal Fleet Member Identifier (UFMI). The UFMI is composed of a series of numbers which represent an Urban ID, Fleet ID, and Member ID. An Urban ID corresponds to a location area where a subscriber's information can be found. Typically, an Urban ID is associated with each DAP, which generally covers a city. Due to the number of digits in the Urban ID there can only be a limited number of DAPs provisioned in a wireless macro network. If the components of the wireless macro network 202 were provisioned on each private communication network 201 then the growth of the wireless macro network would be limited by the number of private wireless networks 202, and likewise the number of private wireless networks 201 would be limited by the number of DAPs in the wireless macro network. Accordingly, it would be desirable to provision the private wireless networks 201 without requiring a new Urban ID for each private wireless network 201.

In accordance with exemplary embodiments, dispatch call processing is provided for private wireless networks 201 without using new Urban IDs. Specifically, the private wireless network controller 232 is coupled to the DACS 208 of the wireless macro network 202, thereby allowing dispatch and interconnect calls to be routed through the wireless macro network 202 to other subscribers of the wireless macro network without requiring new Urban IDs. The private wireless network, by appearing as another BTS to the wireless macro network, does not require a new Urban ID.

Alternatively, if there are a sufficient number of available Urban IDs in the wireless macro network, the private wireless network can be configured as its own location area. In an iDEN network this would include an interconnect location area (ILA) and a dispatch location area (DLA). Accordingly, the private wireless network would broadcast its location area identification which will cause mobile stations to perform location updates when they move into the coverage area of the private wireless network. The location updates would result in transferring of subscriber data for the mobile station from the wireless macro network to the private wireless network.

Figure 3:
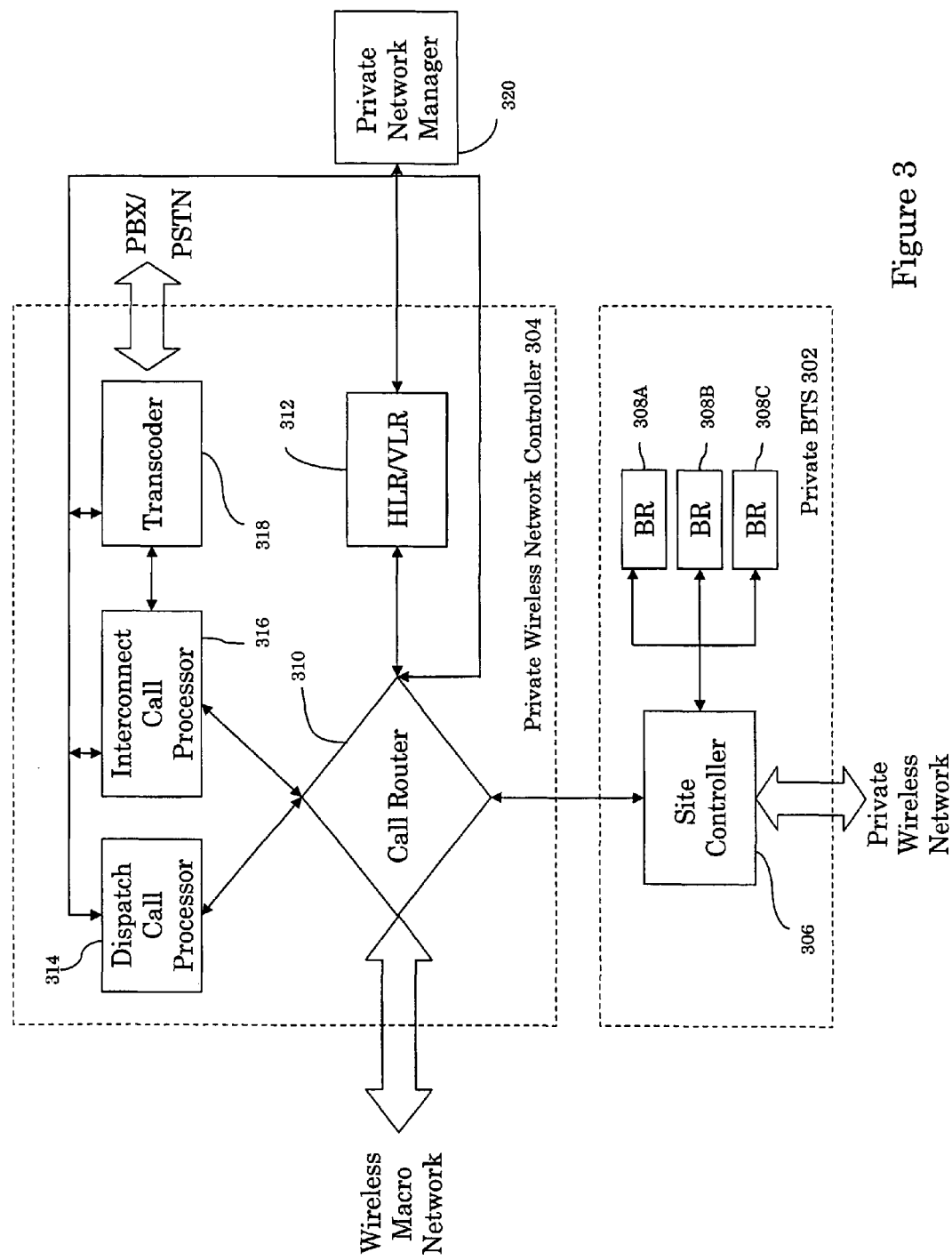
FIG. 3 illustrates a block diagram of an exemplary private wireless network controller and Base Transceiver Station (BTS)

FIG. 3 illustrates a block diagram of an exemplary private BTS 302 and private wireless network controller 304. The private wireless network controller 304 includes a call router 310, a Home Location Register/Visitor Location Register database (HLR/VLR) 312, a dispatch call processor 314, an interconnect call processor 316, and a transcoder 318.

The private BTS 302 includes a site controller 306, such as an iDEN site controller (iSC), and a plurality of base radios (BR) 308A-308C. The site controller operates in a similar manner to a macro network site controller, and can connect the base radios 308A-308C to the antennas of the private wireless network.

The base radios can operate using the same or different protocols. For example, base radios 308A and 308B can provide voice over wireless IP communications while base radio 308C can provide a wireless communications protocol which is compatible with a wireless macro network, such as GSM, CDMA, TDMA or iDEN wireless communications protocol. Providing a number of radios which operate in accordance with a number of different air interface protocols allows a company to provide dual-protocol compatible mobile stations to some employees who are authorized to make wireless telephone calls in both the private wireless network and the wireless macro network, while providing mobile stations which are only compatible with the private wireless network (e.g., which operate using voice over wireless IP protocols) to those employees who are only authorized to make wireless communications over the private wireless network. Alternatively, or additionally, employees who are authorized to make wireless telephone calls in both the private wireless network and the wireless macro network can have a mobile station which operates using the wireless macro network protocols.

Although illustrated in FIG. 3 as separate elements, the functions of each of the elements of the private wireless network controller 304 can be performed by a single element such as a computer programmed to perform the functions. Additionally, the functions can be performed by a single element with hard-wired logic to perform these functions such as an Application Specific Integrated Circuit (ASIC), Field Programmable Gate-Array (FPGA), or the like. Moreover, the private BTS and the private wireless network controller 304 can be combined into a single unit. However, in order to maintain compatibility with the wireless macro network, the call router 310 should be connected to the macro network.

Call router 310 uses HLR/VLR 312 to determine whether the subscriber associated with the dialed number is located on the private wireless network, located at a voice terminal accessible by the PBX, located at a communication device accessible via the PSTN, or located within the wireless macro network. Specifically, the HLR/VLR 312 includes an identifier, such as a telephone number, for each destination located in the private network. The call router 310 compares an identifier in a call setup message with identifiers stored in the HLR/VLR 312. If the identifier is not stored in the HLR/VLR 312 and the identifier has the proper formatting for a PSTN number, the call router 310 will route the call to the PSTN.

For dispatch calls, the call router 310 employs dispatch call processor 314. The dispatch call processor 314 performs similar functions to those conventionally performed by a DAP in a wireless macro network. Similarly, for interconnect calls where the destination terminal is accessible either from the PBX or via the PSTN, call router 310 employs interconnect call processor 316. Because the mobile station uses a particular type of coding for transmitting voice to the private wireless network, transcoder 318 changes the voice coding such that it is compatible with the voice coding used by the PBX or the PSTN, such as Pulse Code Modulation (PCM) coding.

For communications in which the destination communication device is accessible via the wireless macro network, the call router 310 routes the communication to the wireless macro network. If the voice coding of the communication received by the call router 310 is not compatible with the wireless macro network, the call router 310 can include transcoding functionality such that the communications are compatible with the wireless macro network. Similarly, if the voice coding of communications from the wireless macro network are not compatible with the communication devices of the private wireless network, the call router 310 can perform transcoding for communications destined for the private wireless network.

The system also includes a private network manager 320 which is coupled via a bus to all of the component of the private wireless network 304. The private network manager 320 is used for provisioning users in the private network, setting call restrictions, and the like. The private network manager 320 can be a computer which is either operated directly by a user using its associated input device, or the private network manager can be a server which is accessible via a web browser for remotely accessing the functionality of the private network manager 320.

Figure 4:
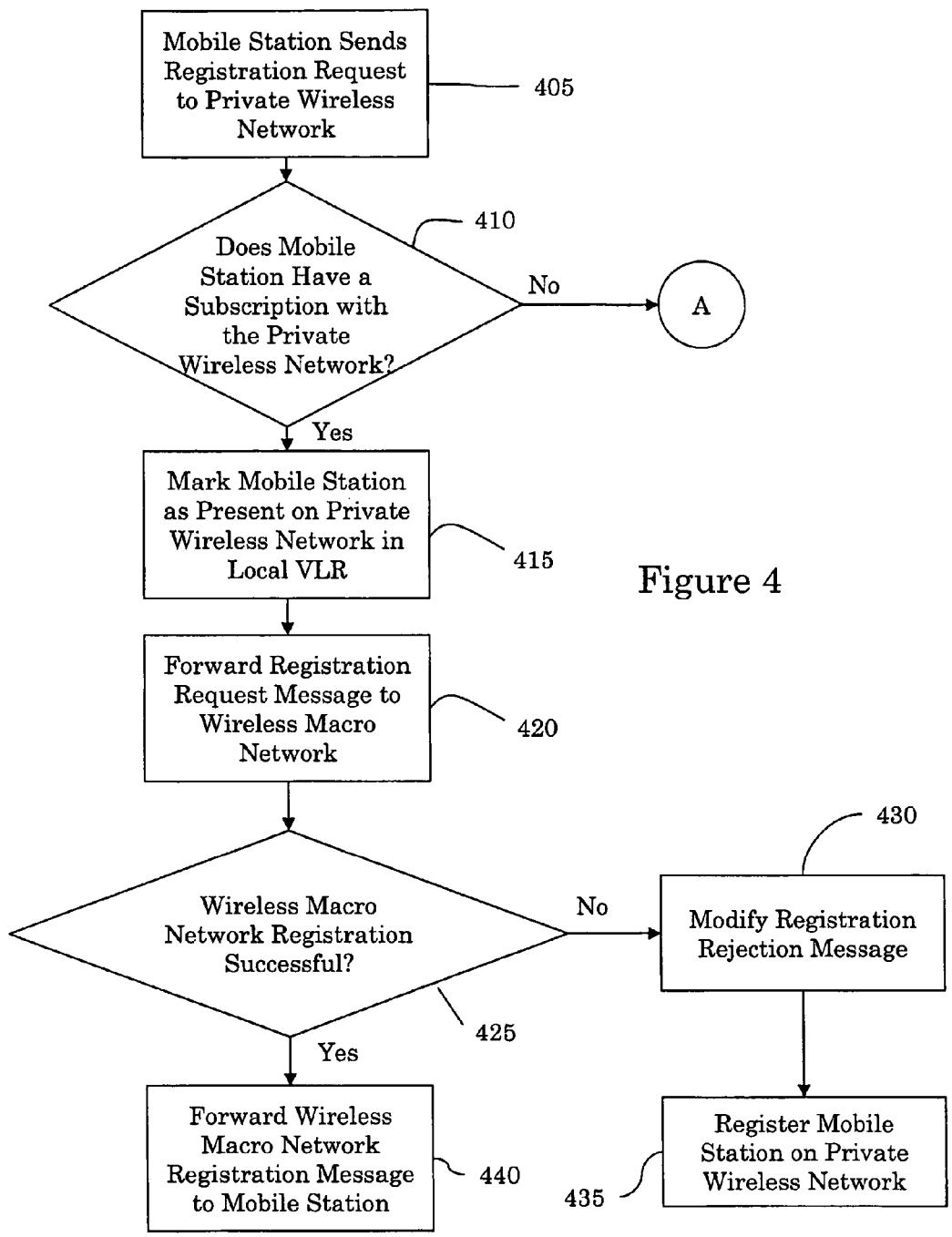
FIG. 4 illustrates a flow diagram of an exemplary method of registering a subscriber of a private wireless network with the private wireless network.
Figure 5:
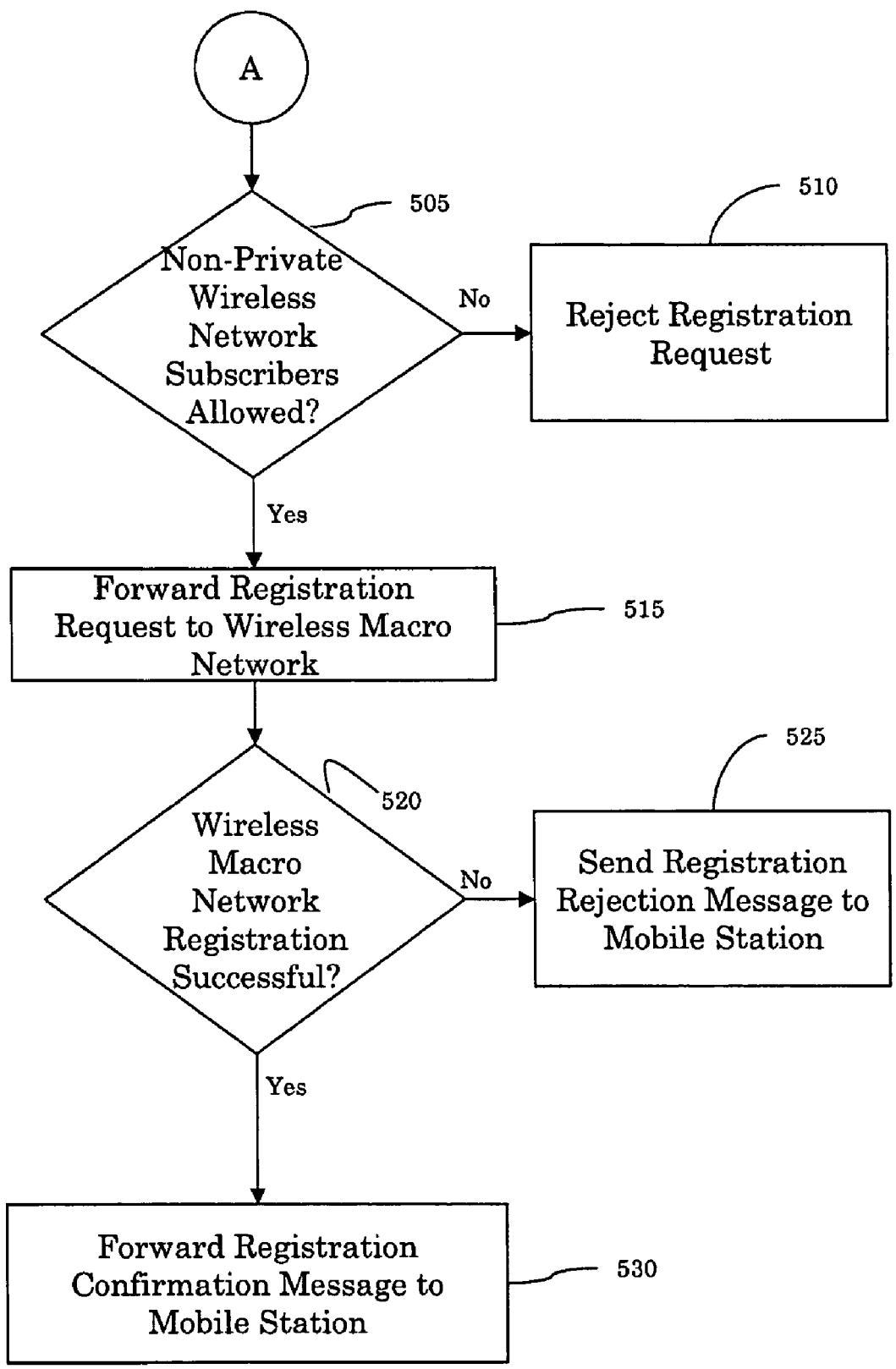
FIG. 5 illustrates a flow diagram of an exemplary method of registering a non-subscriber of a private wireless network with the private wireless network.

FIG. 4 illustrates an exemplary method for registering a subscriber of a private wireless network. A mobile station sends a registration request to the private wireless network (step 405). The private wireless network determines whether mobile station has a subscription with the private wireless network (step 410). If the mobile station does not have a subscription with the private wireless network ("No" path out of decision step 410), then the processing described below in connection with FIG. 5 is performed. If, however, the mobile station has a subscription with the private wireless network ("Yes" path out of decision step 410), then the private wireless network marks the mobile station as present on the private wireless network in the local VLR (step 415).

The private wireless network forwards the registration request message to the wireless macro network (step 420) and waits for a response. Mobile stations which are authorized to operate on both the private wireless network and the wireless macro network will be provisioned in location databases in both the wireless macro network and the private wireless network. These mobile stations are assigned telephone numbers associated with the wireless macro network. Accordingly, telephone calls destined to these telephone numbers will be initially routed to the wireless macro network. Mobile stations which are not authorized to operate on the wireless macro network will be provisioned only in the location database of the private wireless network. These mobile stations will have telephone numbers associated with the PBX of the private communication network. Accordingly, telephone calls destined for these mobile stations will be routed to the PBX.

If the wireless macro network responds with a registration rejection message ("No" path out of decision step 425), then the wireless private network modifies the registration rejection message (step 430) and registers the mobile station on the private wireless network (step 435). Accordingly, the mobile station will only be able to operate on the private wireless network, and will not be able to handoff onto the wireless macro network.

If, however, the wireless macro network responds with a registration successful message ("Yes" path out of decision step 425), then the private wireless network forwards the registration successful message to the mobile station (step 440). Because the mobile station is registered with the wireless macro network as being located on the private wireless network, the mobile station can handoff to base stations of the wireless macro network.

FIG. 5 illustrates a flow diagram of an exemplary method for a mobile station which does not have a subscription with the private wireless network to attempt a registration with the private wireless network. When the private wireless network receives a registration request from a mobile station which does not have a subscription with the private wireless network, the private wireless network determines whether non-subscribers are allowed to register (step 505). If non-subscribers are not allowed to register with the private wireless network ("No" path out of decision step 505), then the private wireless network rejects the registration request (step 510). If, however, the private wireless network allows registrations from non-subscribers ("Yes" path out of decision step 505), then the private wireless network forwards the registration request to the wireless macro network (step 515) and waits for a response from the wireless macro network.

If the wireless macro network registration attempt is not successful ("No" path out of decision step 520), then the private wireless network forwards the registration rejection message to the mobile station. If, however, the wireless macro network registration is successful ("Yes" path out of decision step 520), then the private wireless network forwards the registration confirmation message to the mobile station (step 530).

Figure 6:
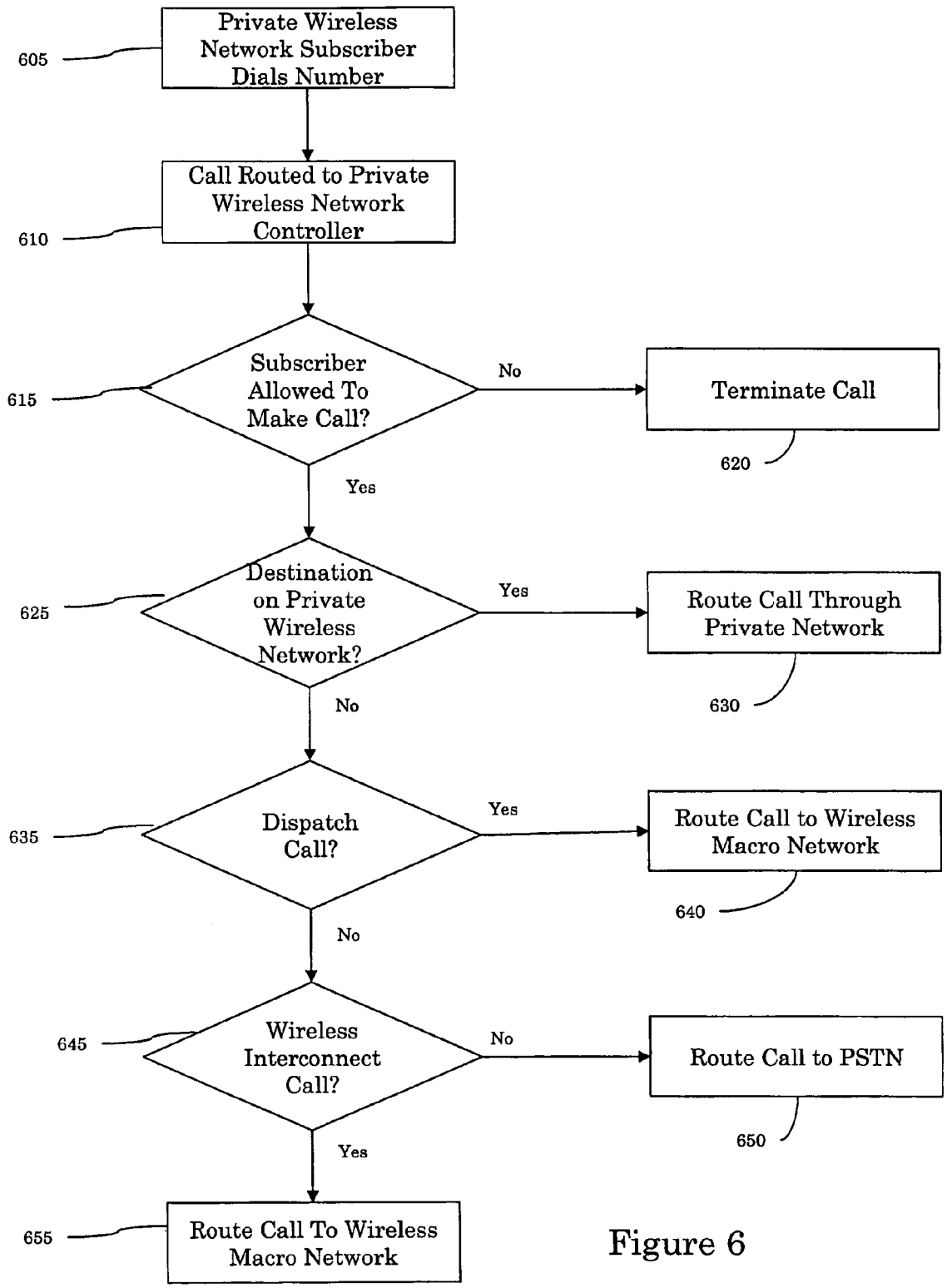
FIG. 6 illustrates a flow diagram of an exemplary method for a subscriber of the private wireless network for initiating communications over a private wireless network.

FIG. 6 is a flow diagram of an exemplary method for a private wireless network subscriber to make a call while located within the private wireless network. When a private wireless network subscriber dials a number (step 605) the call is routed to the private wireless network controller (step 610). The private wireless network controller determines, based upon the dialed number, whether the subscriber is allowed to make the call (step 615). Whether the subscriber is allowed to make the call can depend upon a number of factors including whether the call is a toll call, whether the call is to be routed outside of the private wireless network, and the like. Additionally, although this method is described in connection with a dialed number and a call, it will be recognized that the method is equally applicable to a computer communication where a dialed number would correspond to, for example an electronic mail address and the call would correspond to the electronic mail. Likewise, this method is equally applicable to instant messaging type applications. If the subscriber is not allowed to make the call ("No" path out of decision step 615), then the private wireless network controller terminates the call (step 620).

If the subscriber is allowed to make the call ("Yes" path out of decision step 615), the private wireless network controller then determines whether the destination associated with the dialed number is located on the private wireless network (step 625). If the called party associated with the destination number is located on the private wireless network ("Yes" path out of decision step 625), then the call controller routes the call through the private wireless network (step 630). If the destination subscriber is not located on the private wireless network ("No" path out of decision step 625), then the private wireless network controller determines whether the call is a dispatch call (step 635).

If it is determined that the call is a dispatch call ("Yes" path out of decision step 635), then the private wireless network controller routes the call to the wireless macro network (step 640). If, however, the call is not a dispatch call ("No" path out of decision step 635), then the private wireless network controller determines whether the call is a wireless interconnect call (step 645). If the call is not a wireless interconnect call ("No" path out of decision step 645), then the call is routed to the PSTN (step 650). If the call is a wireless interconnect call ("Yes" path out of decision step 645), then the call is routed to the wireless macro network (step 655).

Figure 7A:
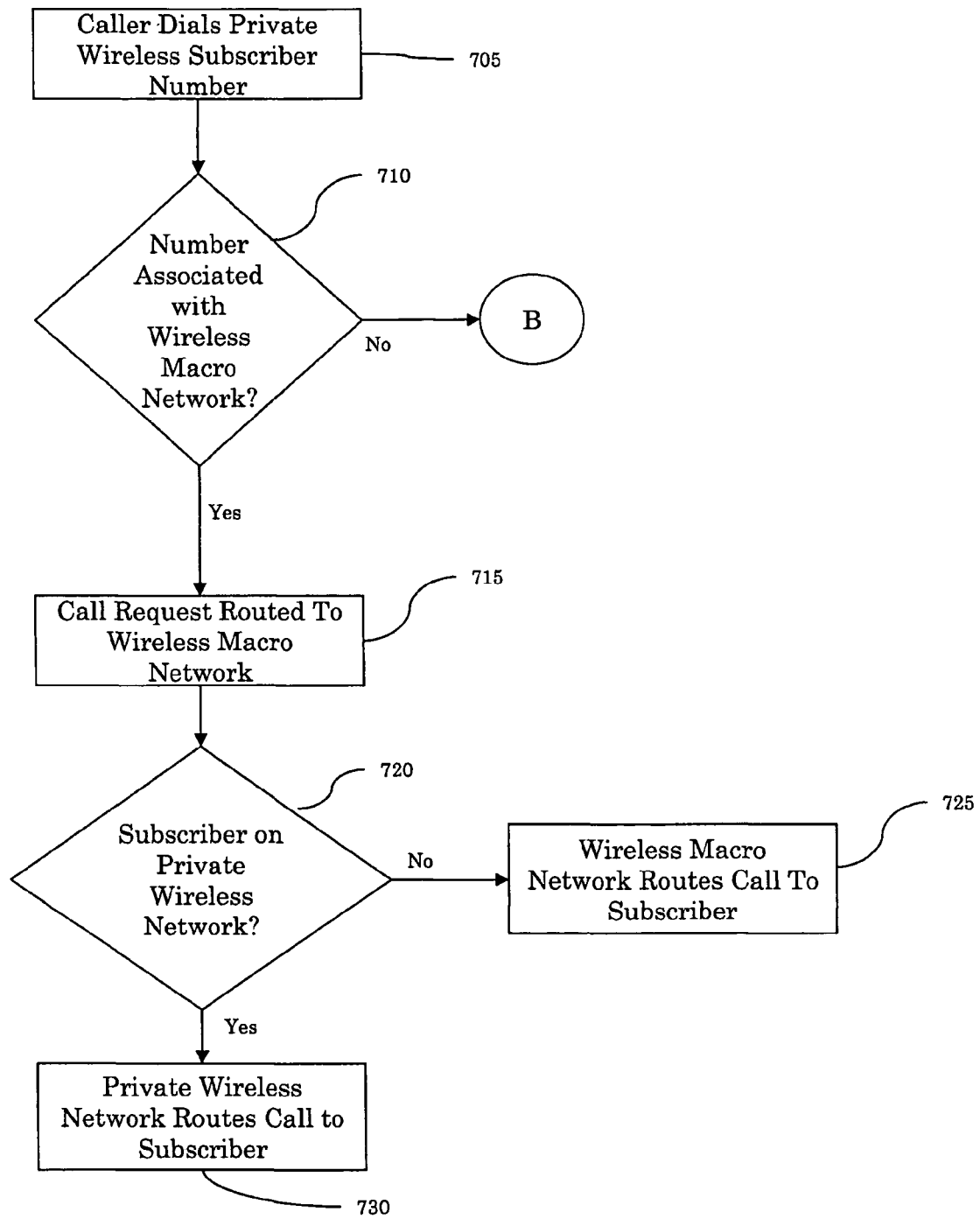
FIGS. 7A and 7B illustrate a flow diagrams of an exemplary method for routing communications to a subscriber of a private wireless network.
Figure 7B:
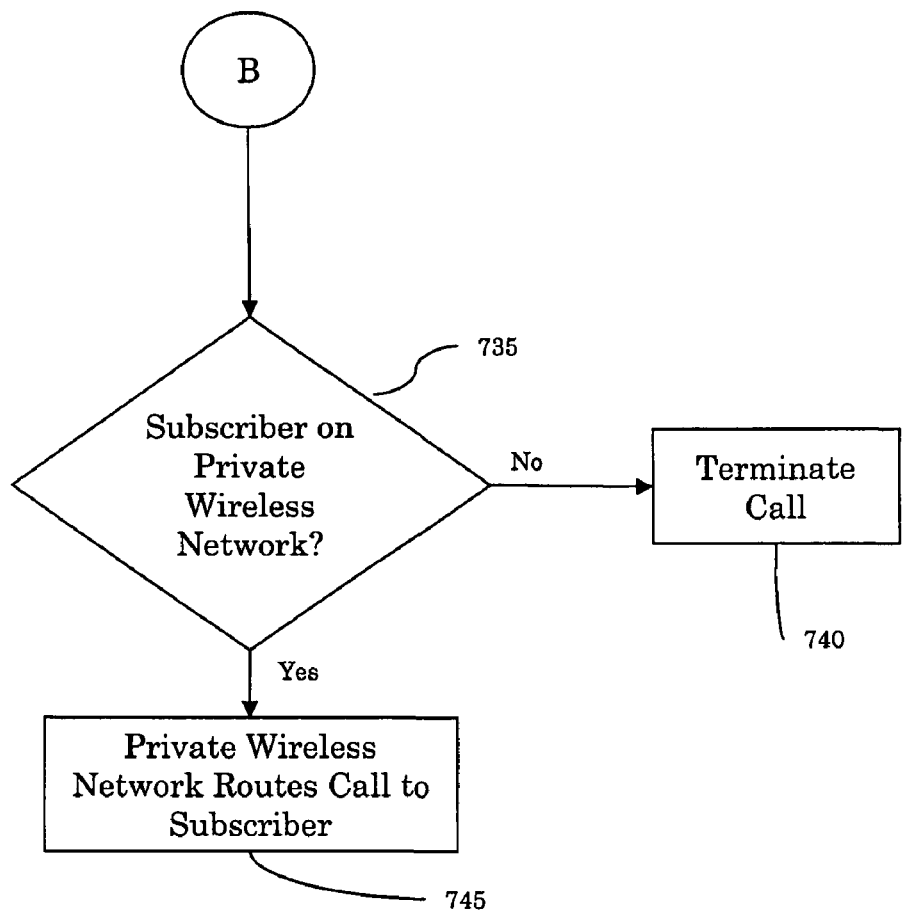

FIGS. 7A and 7B illustrate flow diagrams of an exemplary method of terminating a call to a subscriber of the private wireless network. When a caller dials a number of a private wireless network subscriber (step 705), a determination of whether the called number is associated with the wireless macro network is performed (step 710). This determination is a conventional call processing procedure in which an originating network consults call routing tables to determine a destination network. As discussed above, mobile stations which are authorized to operate on both the private and macro wireless networks will have a telephone number associated with the wireless macro network, while mobile stations which are authorized to operate only on the private wireless network will have a telephone number associated with the PBX. Accordingly, if the originating network determines that the dialed telephone number is associated with the wireless macro network ("Yes" path out of decision step 710), then the call request is routed to the wireless macro network (step 715).

The wireless macro network determines the currently registered location of the subscriber (step 720). Specifically, the wireless macro network determines whether the subscriber is located on private wireless network by accessing a location database, e.g., an HLR, which indicates the location from which the private wireless network subscriber last registered. If the private wireless network subscriber is on the private wireless network ("Yes" path out of decision step 720), then the private wireless network routes the call to the dialed subscriber's mobile station (step 730). If the subscriber is not located on the private wireless network ("No" path out of decision step 720), then the wireless macro network routes the call to the subscriber at the last registered location within the wireless macro network (step 725).

If dialed telephone number is not associated with the wireless macro network, i.e., it is associated with the PBX of the private network ("No" path out of decision step 710), then the call request is forwarded to the private network where it is determined whether the subscriber is currently located on the private wireless network (step 735). If the subscriber is not currently registered on the private wireless network ("No" path out of decision step 735), then the call is terminated (step 740). Termination of the call can involve routing the call originator to a voicemail system associated with the dialed subscriber. If the subscriber is currently located on the private wireless network ("Yes" path out of decision step 735), then the private wireless network routes the call to the subscriber.

The private wireless network disclosed herein can be implemented in a number of different ways. For example, a company can purchase the private wireless network equipment. In this case, the company will also have to maintain the equipment and pay fees to a wireless macro network operator for the connection to the wireless macro network. Alternatively, a wireless macro network operator can provide the private wireless network to the company. The company then pays the wireless macro network operator some type of fee. For example, the company can pay a per user fee for use of the private wireless network. Additionally, the company can pay an additional fee for particular mobile stations to operate on both the private and macro wireless networks. It will be recognized that a company may not pay for fees for all employees to operate on the wireless macro network. In this case, the wireless macro network operator can establish a separate account with the employee for usage of the wireless macro network. Accordingly, the wireless macro network operator would receive fees from the company for the employees use of the private wireless network, and fees from the employee for use of the macro wireless network. If the wireless macro network operator has roaming agreements with 802.11 hotspots, and if the subscriber's mobile station supports VoIP, then the wireless macro network operator can offer a plan which includes roaming to 802.11 hotspots.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A private communication network, comprising:
 a private base transceiver station coupled to a plurality of antennas; and
 a private wireless network controller coupled to a private branch exchange, a wireless macro network and the private base transceiver station, the private wireless network controller comprising
  a home location register/visitor location register (HLR/VLR);
  a dispatch call processor; and
  an interconnect call processor;
 wherein the wireless macro network includes a location database;
 wherein when a mobile station is assigned a telephone number associated with the wireless macro network, the mobile station is provisioned in the location database of the wireless macro network and the HLR/VLR of the private wireless network controller; and
 wherein when the mobile station is assigned a telephone number associated with the private branch exchange, the mobile station is provisioned in the HLR/VLR of the private wireless network controller, but not the location database of the wireless macro network.

2. The private communication network of claim 1, wherein the private base transceiver station comprises a plurality of base radios coupled to the plurality of antennas.

3. The private communication network of claim 2, wherein at least two of the plurality of base radios operate using different air interface protocols which are selected from the group consisting of integrated dispatch enhanced network (iDEN), code division multiple access (CDMA), time division multiple access (TDMA), global system for mobile communications (GSM), digital advanced mobile telephone service (D-AMPS), and Voice over Wireless Internet Protocol air interface protocols.

4. The private communication network of claim 1, wherein the private wireless network controller receives a registration message from one of the plurality of antennas and determines whether a mobile station associated with the registration message is authorized to register with the private wireless network controller.

5. The private communication network of claim 4, wherein a mobile station is authorized to register with the private wireless network controller when an identification associated with the mobile station in the registration message is stored in the HLR/VLR.

6. The private communication network of claim 4, wherein when an identification in the registration message is not stored in the HLR/VLR, the private wireless network controller determines whether the mobile station is authorized to register using information from the wireless macro network.

7. The private communication network of claim 1, wherein the private wireless network controller is coupled to a digital access cross-connect switch (DACS) in the wireless macro network.

8. The private communication network of claim 1, wherein the private wireless network controller is coupled to a base site controller (BSC) in the wireless macro network.

9. The private communication network of claim 1, further comprising:
 a private network manager, wherein the private network manager provisions subscribers in the private network.

10. The private communication network of claim 1, wherein the private communication network is assigned its own location area.

11. A private wireless network comprising:
 a private wireless network controller that includes a home location register/visitor location register (HLR/VLR) and that is coupled to a private branch exchange and a wireless macro network; and
 private base transceiver station coupled to the private wireless network controller, wherein the private wireless network controller is coupled to the wireless macro network as a base station of the wireless macro network by coupling the private wireless network controller to a digital access cross-connect switch (DACS) of the wireless macro network;
 wherein the wireless macro network includes a location database;
 wherein when a mobile station is assigned a telephone number associated with the wireless macro network, the mobile station is provisioned in the location database of the wireless macro network and the HLR/VLR of the private wireless network controller; and
 wherein when the mobile station is assigned a telephone number associated with the private branch exchange, the mobile station is provisioned in the HLR/VLR of the private wireless network controller, but not the location database of the wireless macro network.

12. The private wireless network of claim 11, wherein the private wireless network controller initiates and terminates dispatch calls between mobile stations in the wireless macro network and private wireless network using the connection to the DACS.

13. The private wireless network of claim 11, wherein the private wireless network controller is coupled to a base site controller (BSC) of the wireless macro network.

14. The private wireless network of claim 11, wherein the private wireless network controller comprises:
 a transcoder for converting coding of voice communications originating in the private wireless network to coding compatible with a network associated with the private branch exchange.

* * * * *